United States Patent [19]

Ekman

[11] Patent Number: 4,475,748
[45] Date of Patent: Oct. 9, 1984

[54] COUPLING DEVICE

[76] Inventor: Kjell R. Ekman, Schanz 10, CH-6300 Zug, Switzerland

[21] Appl. No.: 267,318

[22] Filed: May 26, 1981

[30] Foreign Application Priority Data

Jun. 6, 1980 [SE] Sweden ............................. 8004243

[51] Int. Cl.³ ............................................. F16L 35/00
[52] U.S. Cl. ........................................ 285/3; 285/12; 285/351; 285/354; 285/388
[58] Field of Search .................. 285/3, 4, 12, 321, 49, 285/50, 351, 354, 388, 340

[56] References Cited

U.S. PATENT DOCUMENTS

| 115,917 | 6/1871 | Wharton | 285/351 X |
| 3,142,498 | 7/1964 | Press | 285/12 |
| 3,365,219 | 1/1968 | Nicolaus | 285/340 |
| 3,985,379 | 10/1976 | Normark | 285/340 |
| 3,990,730 | 11/1976 | Ekman | 285/351 X |
| 4,278,276 | 7/1981 | Ekman | 285/321 X |
| 4,294,473 | 10/1981 | Ekman | 285/321 X |

FOREIGN PATENT DOCUMENTS

| 2706323 | 8/1977 | Fed. Rep. of Germany | 285/351 |
| 640583 | 5/1962 | Italy | 285/354 |
| 982,004 | 2/1965 | United Kingdom | 285/3 |
| 1018227 | 1/1966 | United Kingdom | 285/340 |

Primary Examiner—Dave W. Arola
Attorney, Agent, or Firm—Pollock, Vande Sande & Priddy

[57] ABSTRACT

Male and female parts (1, 2) are included in a coupling device which is provided with locking members for said parts. The locking members comprise a lock nut (3) which is adapted to be fitted on the female part and a locking ring (4) which can be inserted between two opposite locking surfaces (1a' and 3b) on the male part and the locking unit to prevent mutual pulling-apart movements between the male and female parts. An opposing member (9, 11, 12) is adapted to impart to the locking unit a first distinct longitudinal displacement position in relation to the female part. In this longitudinal displacement position, at least one sealing ring (6, 7) is inserted between the male and female parts and the male part is comparatively loosely suspended in and sealed with respect to the female part by said sealing ring. The opposing member is also adapted to yield to the locking unit when a certain longitudinal displacement force or moment is imparted to this by the opposing member, for which the locking unit assumes a second longitudinal displacement position. In the latter position, a front sealing surface (1d) on the male part cooperates with a seat (2g) provided in the female part to achieve a rigid connection between the parts (1, 2) and a reliable sealing between said parts which may be additionally sealed by one or more sealing rings.

32 Claims, 8 Drawing Figures

COUPLING DEVICE

TECHNICAL FIELD OF APPLICATION

The present invention relates to a coupling device having male and female parts and locking members. In one embodiment the locking members comprise a lock nut which can be fitted disposed on the female part and a locking ring which can be inserted between two opposite locking surfaces on the male part and the lock nut to prevent mutual pulling-apart movements between the male and female parts.

PRIOR ART

It is previously known to dispose male and female parts in a coupling device, the male part being inserted in and sealed with respect to the female part in the assembled position of the device. It is also previously known to use a so-called lock nut which can be screwed onto an external thread on the female part for the mutual locking of the parts against pulling-apart movements. This lock nut is adapted to constitute a securing member for a locking ring or a locking wire which is inserted in an annular outer groove on the male part. The locking ring or locking wire projects up above the annular groove and the lock nut cooperates with the thus projecting part of the locking wire in its position applied to the female part.

The known device also comprises a sealing arrangement between the male and female parts which consists of one or two sealing rings, known per se, for example in the form of O-rings. If two sealing rings are used, these are placed spaced apart and as a result an advantageous so-called double suspension is obtained for the male part in the female part. Said double suspension means that the coupling device, as such, becomes relatively insensitive to vibrations which may occur in an actual application. In a known coupling device, the female part is made with two internal annular grooves in which said two sealing rings are inserted. Moreover, in the known coupling device, the male part is axially symmetrically lowered at its front portion so as to form, together with the inner annular groove in question on the female part, a common space for the actual sealing ring. Said axially symmetrical lowering is made so that it forms a preferably oblique front lateral surface on the male part. In the assembled position of the male and female parts, a front end surface on the male part is set against a corresponding inner surface on the female part with a spacing in between which is intended to ensure said substantially vibration-free suspension of the male part.

DISCLOSURE OF INVENTION

Technical Problem

With said known coupling device, inter alia, there is, in certain cases, a desire to be able to make a so-called rigid connection between the male and female parts, in which connection said front end surface on the male part cooperates with said corresponding surface on the female part, which corresponding surface thus forms a seating surface. In this case, it is desirable that, in said rigid connection, the front end surface on the male part should bear so hard against said seating surface that there is a reliable sealing in the contact and that a medium which is conveyed through the coupled coupling device is prevented from reaching the sealing space which is formed by said annular groove and said axially symmetrical lowering. Such a material-against-material sealing may be appropriate, for example if said medium is of the kind which attacks sealing elements in the form of plastics and/or rubber etc.

THE SOLUTION

The main object of the present invention is to solve the problem outlined above. A characteristic feature of the new coupling device is that associated with the female part is a holding-up member which can cooperate with the locking unit and is adapted to impart to the locking unit a first distinct longitudinal displacement position in relation to the female part in its position on the female part. In said first longitudinal displacement position, at least one sealing ring is adapted to be inserted between the male and female parts and the male part is thus relatively loosely suspended in and sealed with respect to the female part by said sealing ring. The holding-up member is disposed flexibly via the locking unit when a certain longitudinal displacement force, determined by the holding-up member, is imparted to the unit, for which force the locking member assumes a second longitudinal displacement position, and a front sealing surface on the female part cooperates with a seat provided in the female part to achieve a rigid connection between the male and female parts and a reliable sealing between said parts which may be additionally sealed by said sealing ring or rings or completely lack said sealing ring or rings.

In further developments of the idea of the invention, more detailed particulars regarding the construction and insertion of the holding member are proposed. In addition, it is proposed how the parts included in the coupling device should be disposed in connection with the parts affected by the invention.

What can mainly be regarded as characteristic of a coupling device according to the invention, however, can be seen from the the appended claims.

ADVANTAGES

As a result of the subject of the invention it becomes possible, in a simple manner, to bring about an alternative suspension of the male part in the female part. As in the coupling devices previously known, the male part can be mounted relatively free of vibration in relation to the female part in the first longitudinal displacement position in front of the locking unit or lock nut. Such a suspension may be desirable when it is desired to eliminate vibration effects in the male and/or female parts and in cases where a medium is conveyed which does not attack to the sealing ring or sealing rings in question. Alternatively, the male part can be caused to enter into a more rigid connection with the female part when an effective material-against-material seal is obtained, which, in accordance with the above, is advisable for example when the medium conveyed by the coupling device is harmful to the seal materials, when the sealing ring or, in the case with two sealings rings, any of the sealing rings starts to leak, etc.

DESCRIPTION OF THE FIGURES

A form of embodiment which is proposed at present, of a coupling device which has the features significant for the invention will be described below with simultaneous reference to the accompanying drawings in which.

BEST MODE OF CARRYING OUT THE INVENTION

Figure 1:
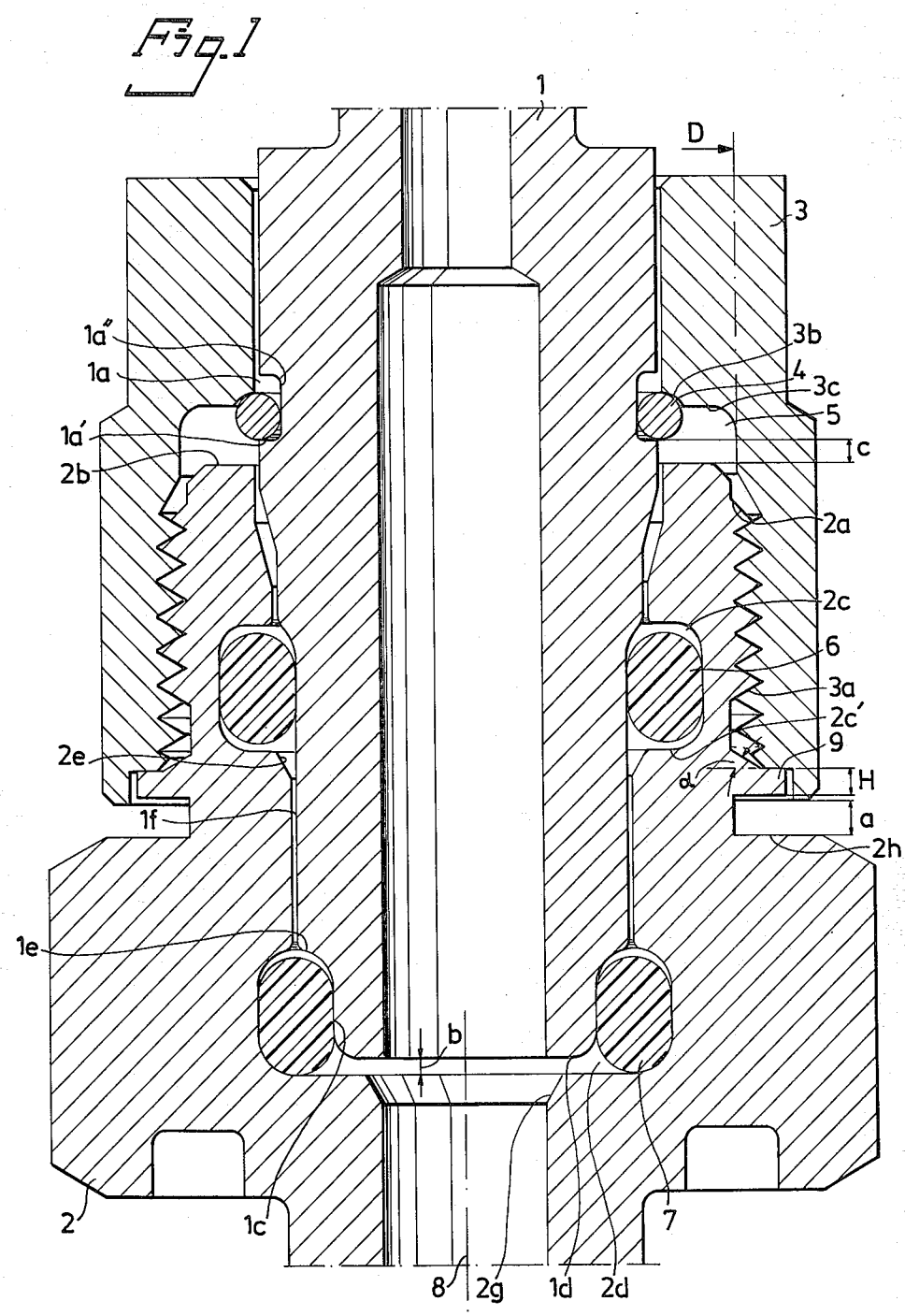
FIG. 1 shows, in a longitudinal section, a coupling device, in which a locking unit included in the device having a first longitudinal displacement position.
Figure 2:
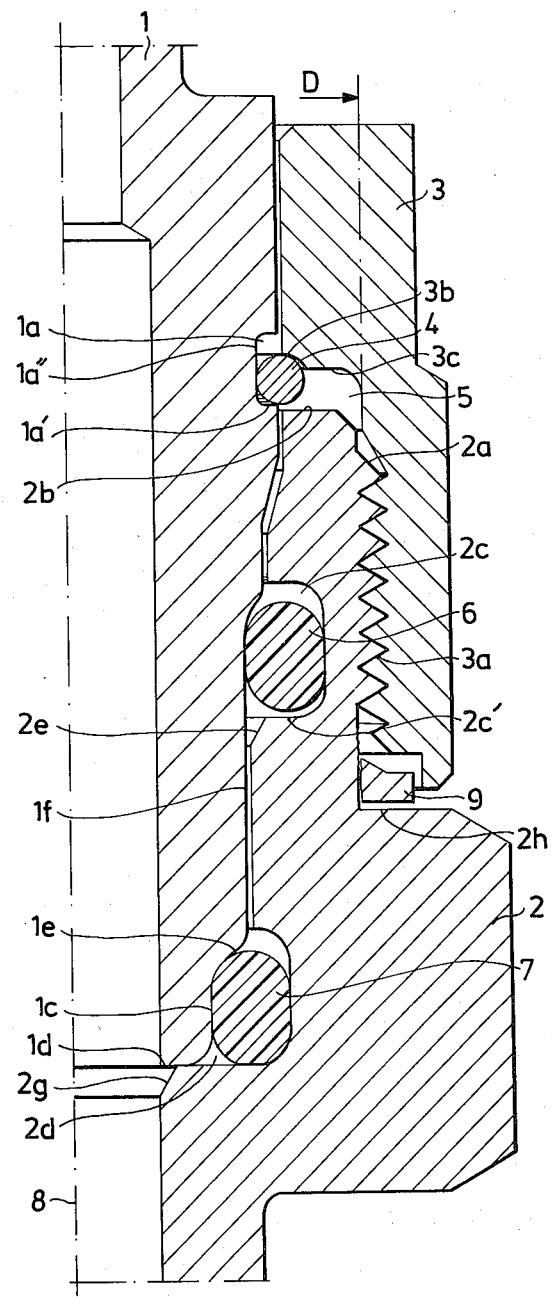
FIG. 2 shows, in a longitudinal section, parts of the coupling device of FIG. 1 with said locking unit in another longitudinal displacement position.

FIGS. 1 and 2 are intended to show a coupling device which is basically known per se and which includes a male part 1 and a female part 2. Said parts 1 and 2 are mutually locked in the axial direction by means of locking members which include on the one hand a lock nut 3, and on the other hand a locking wire or locking ring 4. The lock nut has an internal thread 3a and can be screwed onto the female part via a corresponding external thread 2a on the latter. The lock nut is formed with an internally concave abutment surface 3b which can cooperate with the locking wire 4. The male part is made with an annular outer groove 1a in which the locking ring can be disposed. Said annular outer groove comprises, inter alia, a front boundary surface 1a' and a bottom surface 1a" extending axially. Parts of said surfaces 1a' and 1a" form an abutment surface which is opposite the abutment surface 3b on the lock nut when this assumes the locking position for the male and female parts. The female part is provided with a radial front surface 2b which, together with an inner surface 3c on the lock nut and a partial outer surface 1b on the male part, forms an internal space 5 between said parts. The female part is made with two annular inner grooves 2c and 2d which are disposed internally apart from one another in the axial direction. Said inner grooves form, together with the male part, when this is inserted in the female part, two annular spaces for sealing rings 6 and 7, respectively. The male part is provided, in a manner known per se, at its front tip with an axially symmetrical portion of reduced diameter which, in the inserted position of the male part, is substantially opposite the annular inner groove 2d on the female part. The portion of reduced diameter reduction is made so that a front lateral surface 1c is formed which is preferably inclined in relation to the longitudinal axis 8 of the coupling parts. At the front, said surface 1c merges into a radial end surface 1d and at the back, the surface 1c merges via a radius 1e into a straight cylindrical surface 1f. At the front radial boundary surface 2c' of the annular inner groove 2c, the female part is provided with an oblique bevel 2e which facilitates the guiding of the male part into the female part when the parts are coupled together. In the cavity in the female part for the male part, at the back portion of the cavity, there is provided an opposite surface or a seat 2g for the end surface 1d on the male part.

Figure 3:
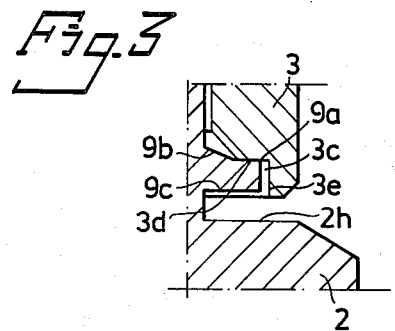
FIG. 3 shows a detail view of a holding member included in the coupling device when the locking unit assumes said first longitudinal displacement position as shown in FIG. 1.

The female part is provided with a radially projecting flange 9 which extends partially or wholly around periphery of the female part. The flange is made with an outer portion of even thickness, the upper surface of which is indicated by 9a in FIG. 3. The flange is further provided with a widened inner portion, the surface of which is indicated by 9b. Said surface 9b is inclined in relation to the surface 9a at an angle α which may be up to 45°, but which is preferably within the range of 10°–30°. The lower surface 9c on the flange is quite straight. The lock nut is provided, at its front end, with an internal recess 3c which is formed by means of a radially extending back boundary surface 3d and an axially extending lateral surface 3e. Said flange is disposed on the female part so that it is situated at a first distance a from a surface 2h extending radially on the female part.

The lock nut can assume two longitudinal displacement positions in relation to the female part 2. In the first longitudinal displacement positions in relation to the female part 2', shown in FIG. 1, the male part is held in an inserted position in the female part where a second distance b or clearance exists between the front end surface 1d on the male part and the seat 2g in the female part. The inner sealing ring 7 acts on the male part axially backwards via the radius 1e so that a certain axial counteracting force occurs in the male part against the locking ring 4 and the lock nut. In this longitudinal displacement position, the lock nut rests against the projecting flange 9 via its radial surface 3d in said internal recess 3c. The flange 9 serves as an opposing member which gives a distinct longitudinal displacement position to the lock nut depending on the axial depth of the recess and the axial position of surface 9a of the flange. The lock nut 3 bears with its surface 3d only against the upper surface 9a of the outer portion, while the slanted surface 9b is not contacted by the lock nut. In this first longitudinal displacement position, the male part is doubly suspended in the sealing rings 6 and 7 which form a vibration-free double suspension for the male part in the female part.

Figure 4:
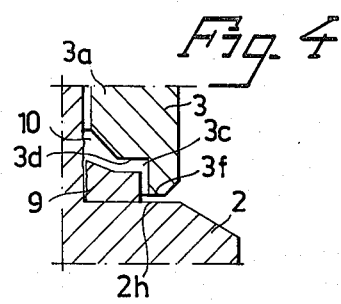
FIG. 4 shows a detail view of the holding-up member of FIG. 3 when the locking unit assumes the other longitudinal displacement position as shown in FIG. 2.

The lock nut can also be given another longitudinal displacement position in relation to the female part as shown in FIG. 2. This second longitudinal displacement position is obtained as a result of the face that an additional screwing force is imparted to the lock nut or a moment of an order of magnitude which means that the lock nut shears off the projecting flange 9. The second longitudinal displacement position is also distinct as a result of the fact that the end surface 1d on the male part cooperates with the seat 2g on the female part. In the second longitudinal displacement position, the front end surface 3f on the lock nut is situated at a predetermined distance above the radial surface 2h on the female part, as shown in FIG. 4. It is presupposed that the further screwing force or moment on the lock nut is of such an order of magnitude that an effective sealing is obtained between said end surface 1d and the seat 2g. In principle, the sealing rings 6 and 7 may remain in their respective annular grooves 2c and 2d but may also be removed if it is intended from the beginning to urge the lock nut into the second longitudinal displacement position. The outer portion of said flange 9 has a thickness of 0.6–2.0 mm, preferably 0.7–1.5 mm. In the example of embodiment shown in which the inner diameter of the thread of the lock nut is equal to 11.0 mm, the height of the breaking edge is 0.8 mm. When the lock nut assumes the first longitudinal displacement position, the first distance a is between 2/10–3/10 greater than the second distance b. A third distance c between the front edge 1a' of the annular groove 1a and the radial front end 2b of the female part is selected so that it is greater than zero even in the second longitudinal displacement position. The projecting flange 9 is of the same material as the female part in the case shown, which material may consist of brass or the like in the present case. The male part and the lock nut are also made of brass or the like, while the locking wire may consist of piano wire for example. The threads 2a and 3a on the female part 2 and the lock nut 3 respectively are selected with a length and a pitch which means that said different longitudinal displacement positions can be reached and that the lock nut is reliably held in each longitudinal displacement position. The construction shown above means that the sheared off projecting flange 9, see FIG. 4, comes to remain in the space 10 formed between the inner recess 3c of the lock nut and the female part.

Figure 5:
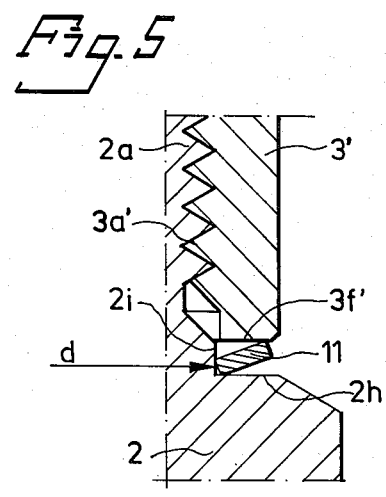
FIG. 5 shows a detail view a holding-up member with a different embodiment from the embodiment shown in FIGS. 3 and 4, when the locking unit, which is likewise modified, assumes the first longitudinal displacement position as shown in FIG. 1.
Figure 6:
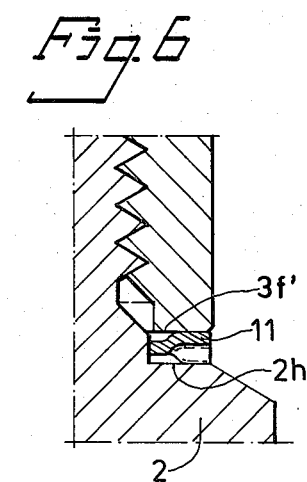
FIG. 6 shows a detail view of the holding-up member of FIG. 5 where the locking unit assumes the other longitudinal displacement position as shown in FIG. 2.

The opposing member described above in the form of a projecting flange can be replaced, in principle, by an opposing member of another form, for example in the form of a spring washer as indicated in FIGS. 5 and 6. Since the formation and operation of such a spring washer is well known, it will not, in itself, be described in more detail. It will merely be stated that said spring washer comprises a plurality of sections 11 which, in the unactuated position of the spring washer, are inclined in relation to the radial surface 2h on the female part 2. The spring washer has an internal diameter which exceeds an external diameter d for an axial surface 2i on the female part and the spring washer is threaded over said lateral surface 2i and rests against the radial surface 2h. The lock nut 3' is modified at its front end and lacks the inner recess described above. Instead, the lock nut is provided with a straight end surface 3f' via which the lock nut cooperates with said sections 11 on the spring washer. The spring washer also provides a relatively distinct first longitudinal displacement position for the lock nut. When the latter is given the further screwing force or said moment, the spring washer is acted upon so that its sections assume the position shown in FIG. 6. In the last-mentioned position, it is assumed, in accordance with the above, that the front end surface 1d has cooperated with the seat 2g on the female part. Said spring washer imparts a certain locking effect to the lock nut which means that the lock nut, in the rigid connection, has a relatively secure locking to the female part and so can cause a secure holding of the male part via the locking wire.

Thus a number of alternative suspensions for the male part in the female part can be obtained by the invention described above. The male part may be suspended comparatively loosely in the female part via one or two sealing rings, and in the form of embodiment of a coupling divece shown, the inner sealing ring is used if only one sealing ring is to be included in the coupling device. Alternatively, the male and female parts can enter into a fixed assembly in which one or two sealing rings are used together with the material-against-material seal established. Alternatively, sealing rings may be omitted entirely in the fixed assembly.

Figure 7:
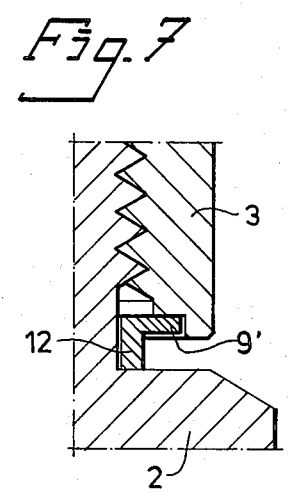
FIG. 7 shows a detail view of a further embodiment of the holding-up or opposing member.

As an alternative, the breaking edge 9 can be positioned on a ring formed member having a position at the female member corresponding to that of spring washer 11. FIG. 7 shows such an embodiment, in which the ring-formed member is designated 12. The breaking edge 9' is preferably in the same material as the rest of the ring-formed member and said member and edge are made in a piece. The ring-formed member and the belonging edge are made in brass or the corresponding materials.

Figure 8:
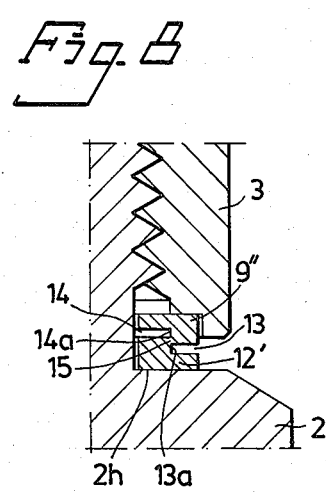
FIG. 8 shows a detail view of a still further embodiment of the holding-up or opposing member.

FIG. 8 shows another embodiment in which the holding-up member 9" is separately arranged in relation to the female member 2. Holding-up member 9" is positioned on the ring member 12' applicable to the concerned support surface 2h on the female member. The mentioned ring member having an outer radial groove 13 and an internal radial groove 14. Said grooves are positioned on different heights in the ring member section. The inner end surfaces 13a and 14a of the groove are positioned substantially above each other for providing a shear or breaking off section 15. Even if preferably, there is no need for the grooves to be straight radial. The widths and extensions of the grooves being such that the lock nut 3 is allowed to effect the necessary movements from the first longitudinal displacement to the second longitudinal displacement when the shear section collaps.

In all embodiments the opposing or holding-up member shall be resistant to the tightening force of the lock nut so that the nut is safely kept in the first displacement position. Preferably the opposing or holding-up member works with a releasing function when the larger force or moment is applied on the lock nut for the actuation of the same to the second displacement position. By the mentioned relasing function the opposing member will not act as an obstacle to the lock nut when it moves to the mention second position. Then, there will be a good indication of the material-to material contact between the male and female members in the mentioned second position of the lock nut, i.e. the opposing member will not cause false indication of the last mentioned sealing contact.

The invention is not limited to the form of embodiment shown by way of example above but may be subjected to modifications within the scope of the following patent claims.

INDUSTRIAL APPLICABILITY

The invention comprises coupling parts which are simple to manufacture and assemble in rational production.

I claim:
1. A coupling device comprising:
   a male portion;
   a female portion, said male portion being inserted into said female portion;
   first, resilient seal means operatively associated with said male and female portions for providing a fluid tight seal therebetween upon engagement of said first resilient seal means by both said male and female portions during insertion of said male portion;
   second seal means operatively associated with said male and female portions for providing a further fluid tight seal therebetween upon engagement of said second seal means by both of said male and female portions, said engagement of said second seal means occurring after said first, resilient seal means has been engaged by both said male and female portions during insertion of said male portion;

locking means extending between said portions for holding said male portion within said female portion in said engagement of said first, resilient seal means in a first position before said second seal means has been engaged by both said male and female portions, said locking means being movable to a second position for holding said male portion in said engagement of said second seal means after said first, resilient seal means has been engaged by both said male and female portions; and means, comprising a deformable member operatively associated with said female portion, for opposing movement of said locking means to said second position until sufficient force is applied by said locking means to overcome abruptly said means for opposing, said deformable member being deformed by said locking means when said sufficient force has been applied, whereby said locking means can move to said second position.

2. A coupling device according to claim 1, wherein said locking means is rotatably mounted on said male portion and comprises an internally threaded bore; said female portion comprises an externally threaded portion for engaging said internally threaded bore; further comprising a locking ring captured between said locking means and said male portion to prevent mutual pulling apart movements among said male and female portions and said locking means.

3. A coupling device according to claim 2, wherein said male portion comprises an annular groove for retaining said locking ring and said locking means comprises an opposing surface for engaging said locking ring, said annular groove being positioned to prevent engagement of said locking ring with said female part in either said first or said second position.

4. A coupling device according to claim 1, wherein said first resilient seal means comprises at least one annular seal ring positioned between said male and female portions.

5. A coupling device according to claim 1, wherein said deformable member comprises a frangible part of said female portion, said frangible part being engaged by said locking means in said first position and being broken by said locking means when said sufficient force has been applied.

6. A coupling device according to claim 1, wherein said frangible part comprises a radially projecting flange on said female portion.

7. A coupling device according to claim 6, wherein said locking means comprises a radially extending surface which engages said frangible part in said first position and shears said frangible part away during movement to said second position.

8. A coupling device according to claim 6, wherein said flange has a thickness in the range of 0.6 to 2.0 mm.

9. A coupling device according to claim 6, wherein said flange has a thickness in the range of 0.7 to 1.5 mm.

10. A coupling device according to claim 6, wherein said flange is positioned above a further, radially extending surface of said female portion, said flange being spaced axially from said further surface at a distance greater than the axial distance between said first and second positions.

11. A coupling device according to claim 6, wherein said flange comprises a radially outer portion having a radial surface contacted by said locking means and a thicker radially inner portion having an inclined surface merging into said radial surface, the angle of said inclined surface being up to 45° above said radial surface.

12. A coupling device according to claim 6, wherein said flange comprises a radially outer portion having a radial surface contacted by said locking means and a thicker radially inner portion having an inclined surface merging into said radial surface, the angle of said inclined surface being between 10° and 30° above said radial surface.

13. A coupling device according to claim 11, wherein said deformable member comprises a radially projecting flange on said female portion.

14. A coupling device according to claim 13, wherein said locking means comprises a radially extending surface which engages said deformable member in said first position and deforms said deformable member during movement to said second position.

15. A coupling device according to claim 1, wherein said second seal means comprises a first annular sealing surface on said male portion and a second annular sealing surface on said female portion, said surfaces being engaged in said second position to form a fluid tight seal.

16. A coupling device according to claim 1, wherein said deformable member comprises a spring washer disposed on a radial surface of one of said male and female portions, in position to be contacted by said locking means.

17. A coupling device according to claim 1, wherein said first, resilient seal means comprises a pair of annular seals and said female part comprises a pair of axially spaced annular grooves for receiving said seals; and said male portion comprises an end portion of reduced diameter for engaging said second seal means.

18. A coupling device according to claim 17, wherein at least one of said annular seals engages said male portion in said first position and both of said annular seals engage said male portion in said second position.

19. A coupling device comprising:
   a male portion;
   a female portion, said male portion being inserted into said female portion to provide a continuous conduit;
   seal means operatively associated with said male and female portions for providing a fluid tight seal therebetween;
   locking means rotatably mounted on said male portion and extended between said portions, for holding said male portion within said female portion and a locking ring captured between said locking means and said male portion to prevent mutual pulling apart movements among said male and female portions and said locking means; and
   means, comprising a deformable member operatively associated with said female portion, for opposing movement of said locking means to a position in which both said male and female portions are held by said locking means in engagement with said seal means until sufficient force is applied by said locking means to overcome abruptly said means for opposing, said deformable member being deformed by said locking means when said sufficient force has been applied, whereby said locking means can move to said position.

20. A coupling device according to claim 18, wherein said deformable member comprises a frangible part of said female portion, said frangible part being engaged by said locking means and being broken by said locking means when said sufficient force has been applied.

21. A coupling device according to claim 20, wherein said frangible part comprises a radially projecting flange on said female portion.

22. A coupling device according to claim 21, wherein said locking means comprises a radially extending surface which engages said frangible part and shears said frangible part away during movement to said position.

23. A coupling device according to claim 21, wherein said flange has a thickness in the range of 0.6 to 2.0 mm.

24. A coupling device according to claim 21, wherein said flange has a thickness in the range of 0.7 to 1.5 mm.

25. A coupling device according to claim 21, wherein said flange is positioned above a further, radially extending surface of said female portion.

26. A coupling device according to claim 21, wherein said flange comprises a radially outer portion having a radial surface contacted by said locking means and a thicker radially inner portion having an inclined surface merging into said radial surface, the angle of said inclined surface being up to 45° above said radial surface.

27. A coupling device according to claim 21, wherein said flange comprises a radially outer portion having a radial surface contacted by said locking means and a thicker radially inner portion having an inclined surface merging into said radial surface, the angle of said inclined surface being between 10° and 30° above said radial surface.

28. A coupling device according to claim 19, wherein said deformable member comprises a radially projecting flange on said female portion.

29. A coupling device according to claim 28, wherein said locking means comprises a radially extending surface which engages said deformable member and deforms said deformable member during movement to said position.

30. A coupling device according to claim 19, wherein said seal means comprises a first annular sealing surface on said male portion and a second annular sealing surface on said female portion, said surfaces being engaged in said position to form a fluid tight seal.

31. A coupling device according to claim 19, wherein said deformable member comprises a spring washer disposed on a radial surface of one of said male and female portions, in position to be contacted by said locking means.

32. A coupling device according to claim 19, wherein said male portion comprises an annular groove for retaining said locking ring and said locking means comprises an opposing surface for engaging said locking ring, said annular groove being positioned to prevent engagement of said locking ring with said female part in said position.

* * * * *